US012093462B2

(12) United States Patent
Faucher et al.

(10) Patent No.: US 12,093,462 B2
(45) Date of Patent: Sep. 17, 2024

(54) VIRTUAL KEYBOARD SELECTIONS USING MULTIPLE INPUT MODALITIES

(71) Applicant: Meta Platforms Technologies, LLC, Menlo Park, CA (US)

(72) Inventors: Aaron Faucher, Seattle, WA (US); Pol Pla I Conesa, San Francisco, CA (US); Daniel Rosas, Auburn, WA (US); Nathan Aschenbach, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/717,585

(22) Filed: Apr. 11, 2022

(65) Prior Publication Data
US 2023/0324997 A1    Oct. 12, 2023

(51) Int. Cl.
*G06F 3/01*     (2006.01)
*G06F 3/04886*  (2022.01)

(52) U.S. Cl.
CPC .............. *G06F 3/017* (2013.01); *G06F 3/013* (2013.01); *G06F 3/04886* (2013.01); *G06F 3/011* (2013.01)

(58) Field of Classification Search
CPC ...... G06F 3/017; G06F 3/013; G06F 3/04886; G06F 3/011; G06T 19/006
See application file for complete search history.

(56) References Cited

U.S. PATENT DOCUMENTS

| 6,204,828 B1 | 3/2001 | Amir et al. |
| 9,182,826 B2 | 11/2015 | Powledge et al. |
| 10,275,023 B2 | 4/2019 | McKenzie et al. |
| 10,976,804 B1 | 4/2021 | Atlas et al. |
| 11,023,035 B1 | 6/2021 | Atlas et al. |
| 11,023,036 B1 | 6/2021 | Atlas et al. |

(Continued)

FOREIGN PATENT DOCUMENTS

| WO | 2017192177 A1 | 11/2017 |
| WO | 2018213801 A1 | 11/2018 |

OTHER PUBLICATIONS

Adhikary J., "Text Entry in VR and Introducing Speech and Gestures in VR Text Entry," MobileHCI 2018 Workshop on Socio-Technical Aspects of Text Entry, Sep. 3, 2018, 3 pages.

(Continued)

*Primary Examiner* — Adam R. Giesy
(74) *Attorney, Agent, or Firm* — Potomac Law Group PLLC; Dannon G. Allbee

(57) ABSTRACT

Aspects of the present disclosure are directed to triggering virtual keyboard selections using multiple input modalities. An interface manager can display an interface, such as a virtual keyboard, to a user in an artificial reality environment. Implementations of the interface manager can track user eye gaze input and user hand input (e.g., hand or finger motion). The interface manager can resolve a character selection on the virtual keyboard according to the tracked user gaze input based on detection that the user's hand motion meets a trigger criteria. For example, the interface manager can: detect that the tracked user hand motion meets the trigger criteria at a given point in time; and resolve a selection from the virtual keyboard (e.g., selection of a displayed character) according to the tracked user gaze on the virtual keyboard at the given point in time.

20 Claims, 11 Drawing Sheets

(56) References Cited

U.S. PATENT DOCUMENTS

| | | | |
|---|---|---|---|
| 2006/0095867 A1 | 5/2006 | Rogalski et al. | |
| 2006/0250372 A1 | 11/2006 | Lii | |
| 2010/0241998 A1 | 9/2010 | Latta et al. | |
| 2012/0326961 A1* | 12/2012 | Bromer | G06F 3/04886 345/156 |
| 2013/0249942 A1 | 9/2013 | Green et al. | |
| 2013/0257751 A1 | 10/2013 | Stafford | |
| 2013/0293580 A1 | 11/2013 | Spivack | |
| 2014/0028567 A1* | 1/2014 | Park | G06F 3/0236 345/168 |
| 2014/0078043 A1 | 3/2014 | Kim | |
| 2014/0078176 A1 | 3/2014 | Kim et al. | |
| 2014/0248950 A1 | 9/2014 | Tosas Bautista | |
| 2014/0337370 A1 | 11/2014 | Aravamudan et al. | |
| 2015/0258432 A1 | 9/2015 | Stafford et al. | |
| 2015/0301740 A1 | 10/2015 | Bozzini et al. | |
| 2016/0054791 A1 | 2/2016 | Mullins et al. | |
| 2016/0077734 A1* | 3/2016 | Buxton | G06F 3/04842 715/773 |
| 2016/0093105 A1 | 3/2016 | Rimon et al. | |
| 2016/0196692 A1 | 7/2016 | Nallstrom et al. | |
| 2016/0216761 A1 | 7/2016 | Klingstrom et al. | |
| 2016/0314624 A1 | 10/2016 | Li et al. | |
| 2017/0160815 A1 | 6/2017 | Glazier et al. | |
| 2017/0228922 A1 | 8/2017 | Kaeser et al. | |
| 2017/0322623 A1 | 11/2017 | McKenzie et al. | |
| 2017/0364144 A1 | 12/2017 | Petrov | |
| 2018/0113669 A1 | 4/2018 | Szeto | |
| 2018/0158250 A1 | 6/2018 | Yamamoto et al. | |
| 2018/0173323 A1 | 6/2018 | Harvey et al. | |
| 2019/0004622 A1 | 1/2019 | O'Brien et al. | |
| 2019/0034076 A1 | 1/2019 | Vinayak et al. | |
| 2019/0065026 A1 | 2/2019 | Kiemele et al. | |
| 2019/0146219 A1 | 5/2019 | Rodriguez, II | |
| 2019/0340821 A1 | 11/2019 | Chen et al. | |
| 2019/0362557 A1 | 11/2019 | Lacey et al. | |
| 2020/0218488 A1 | 7/2020 | Nguyen et al. | |
| 2020/0387287 A1 | 12/2020 | Ravasz et al. | |
| 2021/0011556 A1 | 1/2021 | Atlas et al. | |
| 2021/0099565 A1 | 4/2021 | Sansanwal et al. | |
| 2021/0104100 A1 | 4/2021 | Whitney et al. | |
| 2021/0247900 A1* | 8/2021 | Richardson | G06F 40/274 |
| 2021/0407203 A1 | 12/2021 | Canberk et al. | |
| 2022/0101613 A1 | 3/2022 | Rockel | |
| 2022/0121344 A1* | 4/2022 | Pastrana Vicente | G06F 3/0484 |

OTHER PUBLICATIONS

International Search Report and Written Opinion for International Application No. PCT/US2023/017991, mailed Jun. 30, 2023, 10 pages.

International Search Report and Written Opinion for International Application No. PCT/US2023/018032, mailed Jul. 17, 2023, 10 pages.

Jiang H., et al., "PinchText: One-Handed Text Entry Technique Combining Pinch Gestures and Hand Positions for Head-Mounted Displays," International Journal of Human-Computer Interaction, Aug. 29, 2022, 18 pages.

Jimenez J.G., et al., "Continuous-Motion Text Input in Virtual Reality," University of California, Jan. 2018, 6 pages.

Pfeuffer K., et al., "Gaze and Touch Interaction on Tablets," User Interface Software And Technology, Oct. 16, 2016, pp. 301-311.

Sperber M., et al., "Efficient Speech Transcription through Respeaking," Karlsruhe Institute of Technology, Institute of Anthropomatics, Nov. 12, 2023, 5 pages.

Advisory Action mailed May 3, 2021 for U.S. Appl. No. 16/506,618, filed Jul. 9, 2019, 3 pages.

Ex Parte Quayle mailed Jun. 12, 2020 for U.S. Appl. No. 16/506,183, filed Jul. 9, 2019, 13 Pages.

Final Office Action mailed Dec. 2, 2021 for U.S. Appl. No. 16/506,618, filed Jul. 9, 2019, 26 Pages.

Final Office Action mailed Feb. 24, 2021 for U.S. Appl. No. 16/506,618, filed Jul. 9, 2019, 25 Pages.

Non-Final Office Action mailed Sep. 3, 2020 for U.S. Appl. No. 16/506,618, filed Jul. 9, 2019, 23 Pages.

Non-Final Office Action mailed Jun. 10, 2020 for U.S. Appl. No. 16/506,172, filed Jul. 9, 2019, 22 Pages.

Non-Final Office Action mailed Jun. 16, 2021 for U.S. Appl. No. 16/506,618, filed Jul. 9, 2019, 24 Pages.

Non-Final Office Action mailed May 29, 2020 for U.S. Appl. No. 16/506,158, filed Jul. 9, 2019, 24 Pages.

Notice of Allowance mailed Dec. 4, 2020 for U.S. Appl. No. 16/506,183, filed Jul. 9, 2019, 9 pages.

Notice of Allowance mailed Oct. 21, 2020 for U.S. Appl. No. 16/506,158, filed Jul. 9, 2019, 9 pages.

Notice of Allowance mailed Oct. 26, 2020 for U.S. Appl. No. 16/506,172, filed Jul. 9, 2019, 9 Pages.

Notice of Allowance mailed Feb. 3, 2021 for U.S. Appl. No. 16/506,158, filed Jul. 9, 2019, 9 pages.

Notice of Allowance mailed Aug. 31, 2020 for U.S. Appl. No. 16/506,183, filed Jul. 9, 2019, 8 Pages.

Notice of Allowance mailed Feb. 5, 2021 for U.S. Appl. No. 16/506,172, filed Jul. 9, 2019, 9 Pages.

Response to Ex Parte Quayle Action mailed Jun. 12, 2020 for U.S. Appl. No. 16/506,183, filed Jul. 9, 2019, 18 Pages.

Response to Office Action mailed Dec. 3, 2020 for U.S. Appl. No. 16/506,618, filed Jul. 9, 2019, 13 pages.

Response to Office Action mailed Jun. 10, 2020 for U.S Appl. No. 16/506,172, filed Jul. 9, 2019, 16 Pages.

Response to Office Action mailed Oct. 18, 2021 for U.S. Appl. No. 16/506,618, filed Jul. 9, 2019, 5 pages.

Response to Office Action mailed Apr. 22, 2021 for U.S. Appl. No. 16/506,618, filed Jul. 9, 2019, 11 pages.

Response to Office Action mailed Aug. 31, 2020 for U.S Appl. No. 16/506,158, filed Jul. 9, 2019, 18 Pages.

Tosas M., "AR-Pinboard: An Augmented Reality (AR) Virtual Pinboard," Kickstarter [Online], Oct. 16, 2014 [Retrieved on Oct. 15, 2019], 32 pages, Retrieved from the Internet: URL: https://www.Kickstarter.com/projects/1477538513/ar-pinboard-an-augmented-reality-ar-virtual-pinboa/ref=kicktraq.

* cited by examiner

VIRTUAL KEYBOARD SELECTIONS USING MULTIPLE INPUT MODALITIES

TECHNICAL FIELD

The present disclosure is directed to triggering virtual keyboard selections using multiple input modalities.

BACKGROUND

Artificial reality devices provide opportunities for users to experience mixed reality, augmented reality, and/or virtual reality. However, user interactions in these environments have continued to present challenges. Often, user input is inaccurate or slow, causing user frustration. User input can take many forms, such as tracked motion, eye gaze, touch, joystick, and the like. This variety of input presents challenges to match implemented functionality with a user's expected functionality. Moreover, the different input opportunities present ergonomic challenges as well, as certain types of user input can cause fatigue overtime or can otherwise be uncomfortable for the user.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
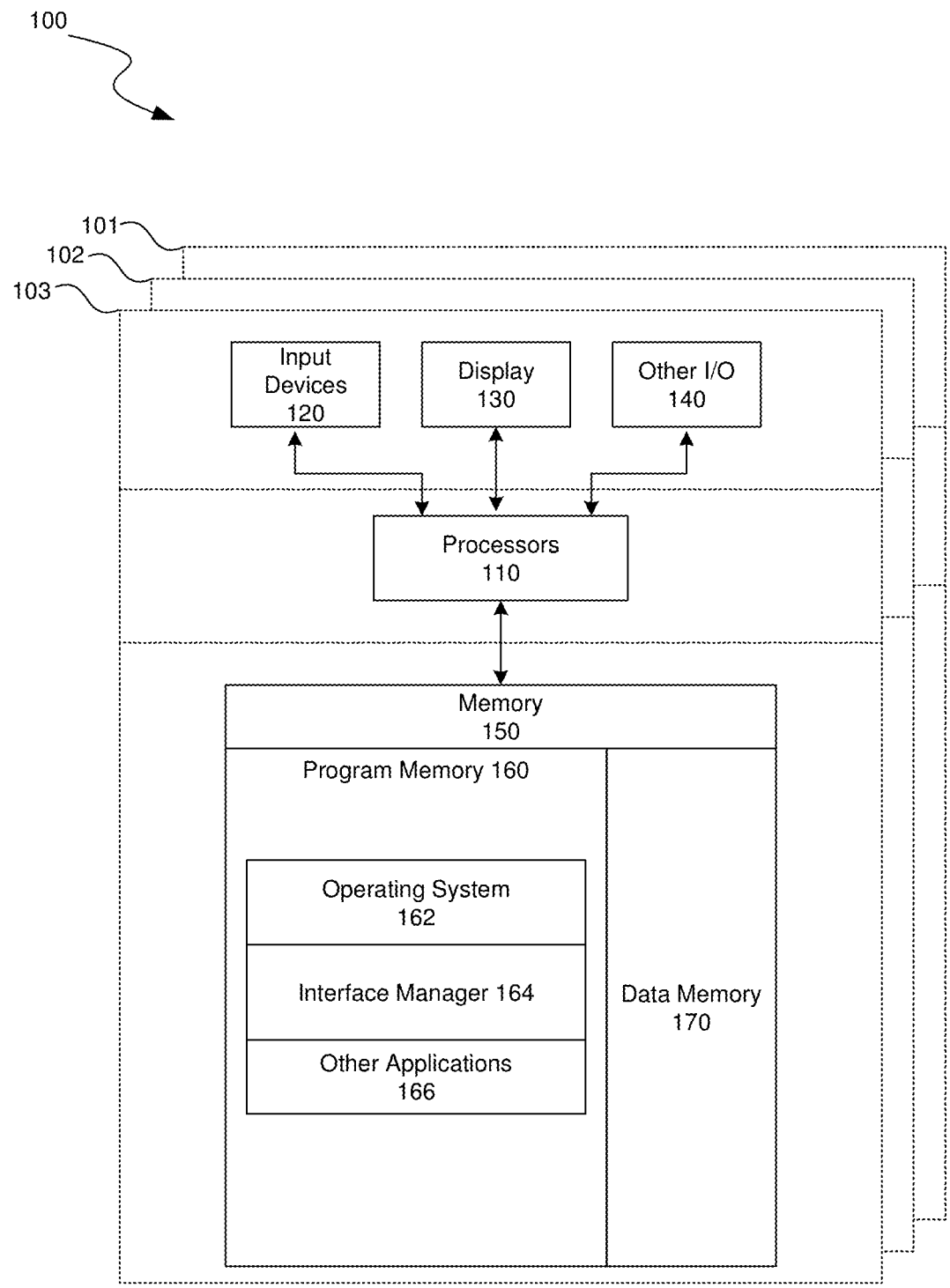
FIG. 1 is a block diagram illustrating an overview of devices on which some implementations of the present technology can operate.

Aspects of the present disclosure are directed to triggering virtual keyboard selections using multiple input modalities. An interface manager can display an interface, such as a virtual keyboard, to a user in an artificial reality environment. The virtual keyboard can be a two-dimensional display or three-dimensional volume that includes alphanumeric characters arranged as elements. Implementations include an artificial reality system for displaying the artificial reality environment to the user and for receiving multiple input modalities from the user and a "virtual keyboard" can be a keyboard provided by various artificial reality systems such as in augmented reality, virtual reality, mixed reality, etc.

Implementations of the interface manager can track user eye gaze input and user hand input (e.g., hand or finger motion). For example, the interface manager can track eye gaze input using one or more sensing devices (e.g., cameras, accelerometers, wearable sensors, etc.) to locate the user's gaze on the virtual keyboard. The interface manager can also track user hand input, such as hand motion (e.g., hand motion and/or finger motion), using one or more sensing devices (e.g., cameras, accelerometers, wearable sensors, controllers, etc.) to detect when the user's hand motion meets a trigger criteria.

Implementations of the interface manager can resolve a character selection on the virtual keyboard based on detection that the user's hand motion meets the trigger criteria. For example, the interface manager can: a) detect that the tracked user hand motion meets the trigger criteria at a given point in time; and b) resolve a selection from the virtual keyboard (e.g., selection of a displayed character) according to the tracked user gaze on the virtual keyboard at the given point in time. Multiple iterations of tracked user hand motion meeting the trigger criteria and resolved selection from the virtual keyboard according to tracked user gaze on the virtual keyboard can be performed to generate a character sequence (e.g., word, sentence, alphanumeric character sequence, etc.) In some implementations, the interface manager can track two user hands and the multiple iterations can correspond to alternating hand motion between the two user hands.

In some implementations, the trigger criteria for the hand motion can detect a 'tap' motion of the user's hand/finger. For example, a tap motion can include forward motion (e.g., relative to the user), acceleration, and backward motion. In some implementations, when the tracked motion for a user's hand first moves forward and then reaches a peak velocity or a minimal velocity (e.g., 0 m/s velocity to indicate a stop in motion) it can indicate that the user has performed a tap motion. The trigger criteria can be a detection that the tracked user's forward hand motion has reached a peak velocity, stopped, and/or detection of a reverse in motion (e.g., backward velocity). Upon detection of this trigger (e.g., detection of a tap), the interface manager can resolve the character on the virtual keyboard selected by the user's gaze (e.g., the character selected by the user's gaze at the time of the detected tap).

In some implementations, alternating motion between the user's hand can include alternating tap motions. For example, a user's right hand can perform a first tap and trigger a first character selection according to the user's gaze at the time of the first tap, then the user's left hand can perform a second tap and trigger a second character selection according to the user's gaze at the time of the second tap. This alternating tap motion can continue to trigger character selections until a character sequence is generated.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Conventional XR input interfaces fail to provide experiences that meet user expectations, can cause fatigue and/or strain, and fail to deliver reliable/accurate results. For example, the conventional XR collider virtual keyboards can track user hand movements and identify when a hand movement collides with a virtual keyboard element. However, this conventional technique can cause hand/arm fatigue, neck fatigue, and/or eye fatigue due to the limitations on where the virtual keyboard can be displayed and can be inaccurate. Another XR keyboard can track user gaze to select each character from the virtual keyboard. However, this technique can cause eye strain and also produces relatively low accuracy/reliability.

Implementations of the disclosed technology are expected to overcome these deficiencies in conventional systems by combining inputs from multiple modalities to support an improved user experience for interacting with an XR input interface. For example, both user gaze and user hand motion can be tracked, where tracked user gaze can select a character from a virtual keyboard and tracked user hand motion can trigger the character selection. For example, an interface manager can detect that the tracked user hand motion meets a trigger criteria (e.g., detect a tap motion) at a given point in time and resolve a character selection from the displayed virtual keyboard according to the tracked user gaze on the virtual keyboard at the given point in time.

Because the user's hand/finger do not collide with the virtual keyboard to select characters, the virtual keyboard can be displayed at a distance that optimizes for visual convergence (e.g., at least 0.5 meters away, between 0.8 and 1.5 meters away, and the like) to minimize eye strain, and at a location that minimizes neck strain (e.g., within the user's line of sight given the user's gaze). Moreover, the use of a tap motion as a trigger for the gaze-based character selection implements a natural and ergonomic user mechanism that substantially improves over the accuracy and time efficiency drawbacks of conventional solo gaze-based character selection techniques. In addition, the combination of a gaze-based selection and a hand motion trigger permits the user to "type" on a virtual keyboard with reduced points of friction (e.g., body fatigue, stress positions, etc.), which can also produce increased speed and accuracy.

Several implementations are discussed below in more detail in reference to the figures. FIG. 1 is a block diagram illustrating an overview of devices on which some implementations of the disclosed technology can operate. The devices can comprise hardware components of a computing system 100 that trigger virtual keyboard selections using multiple input modalities. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, interface manger 164, and other application programs 166. Memory 150 can also include data memory 170 that can include, e.g., prediction models, threshold data, criteria data, alphanumeric character data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
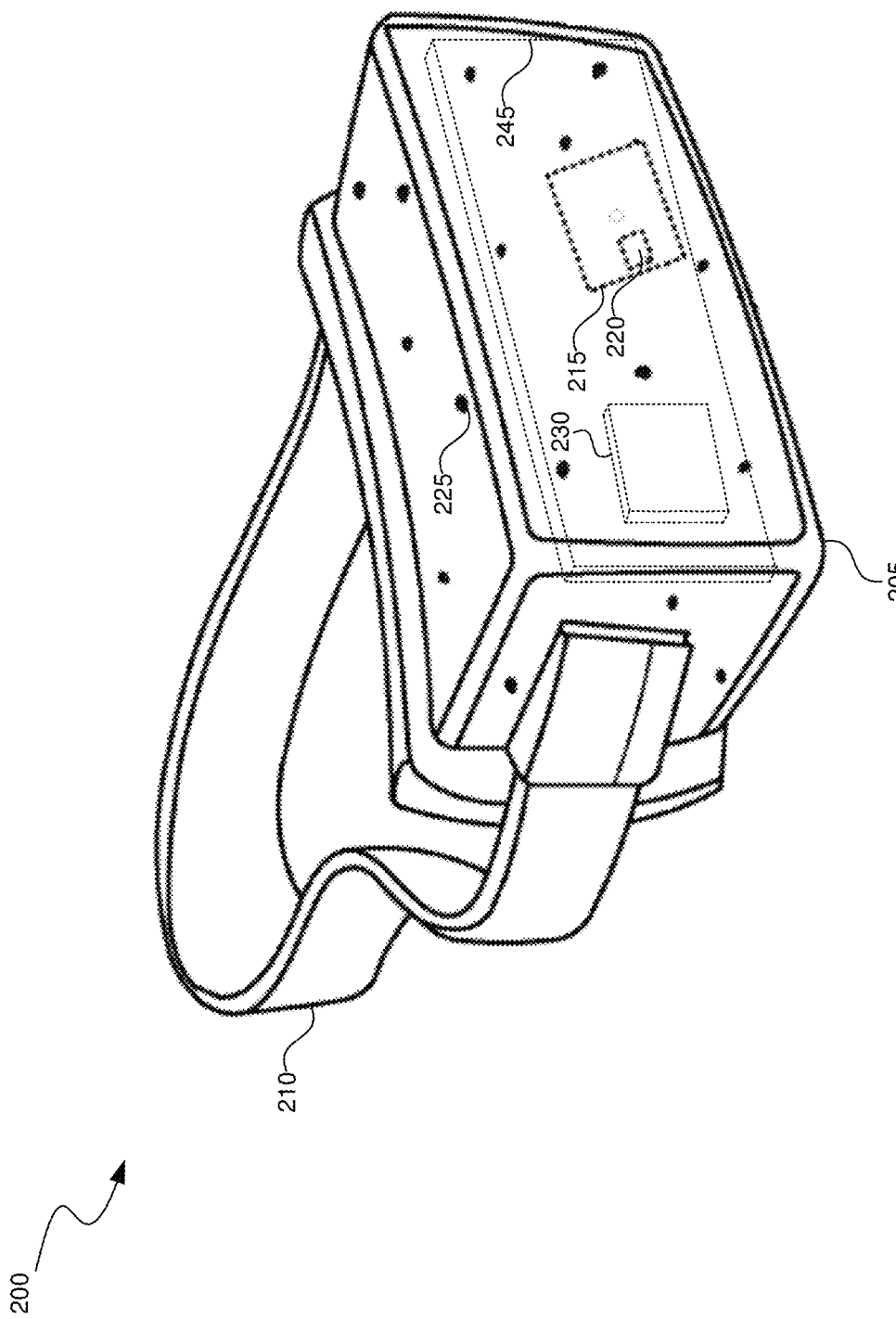
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
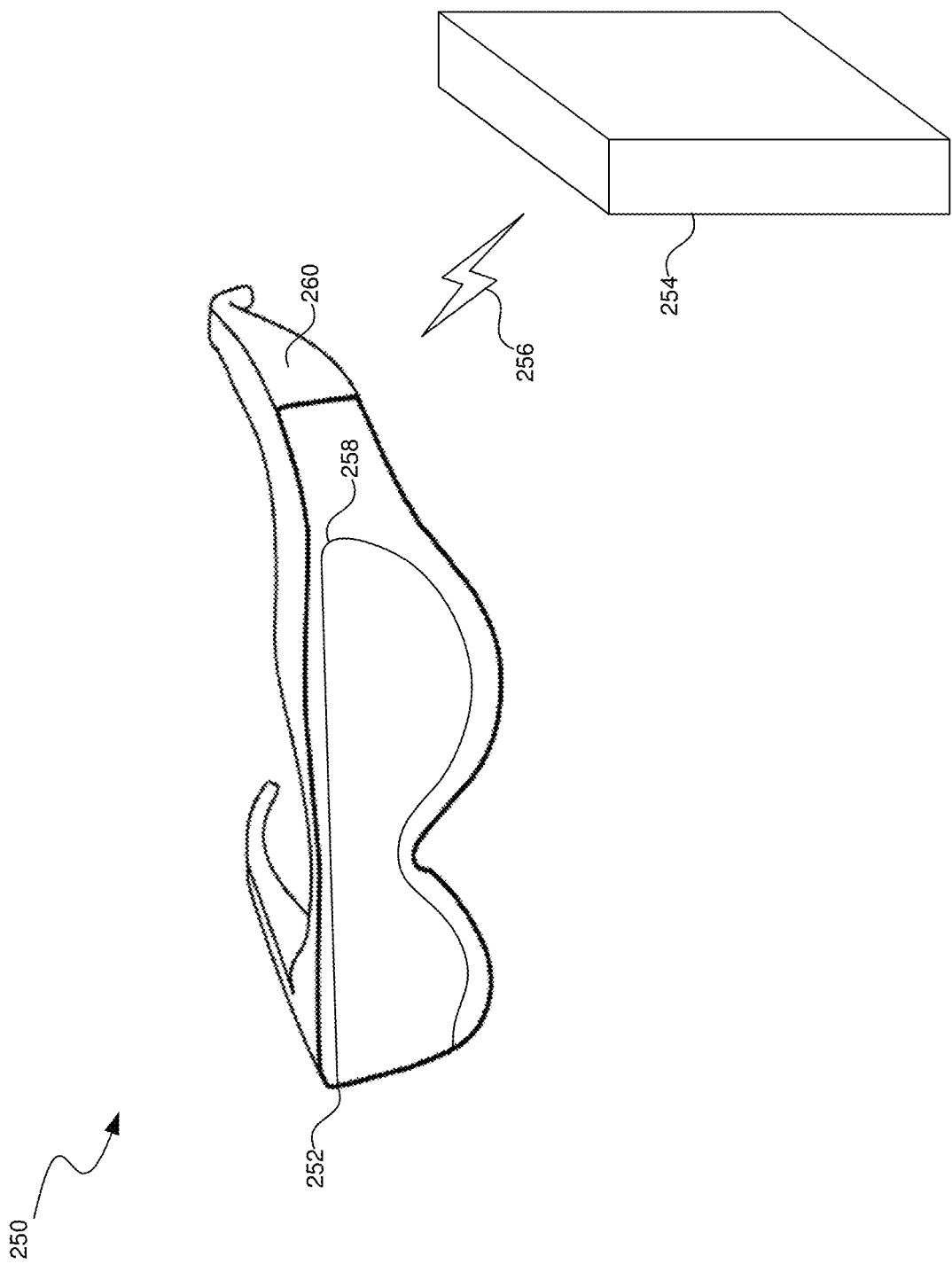
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
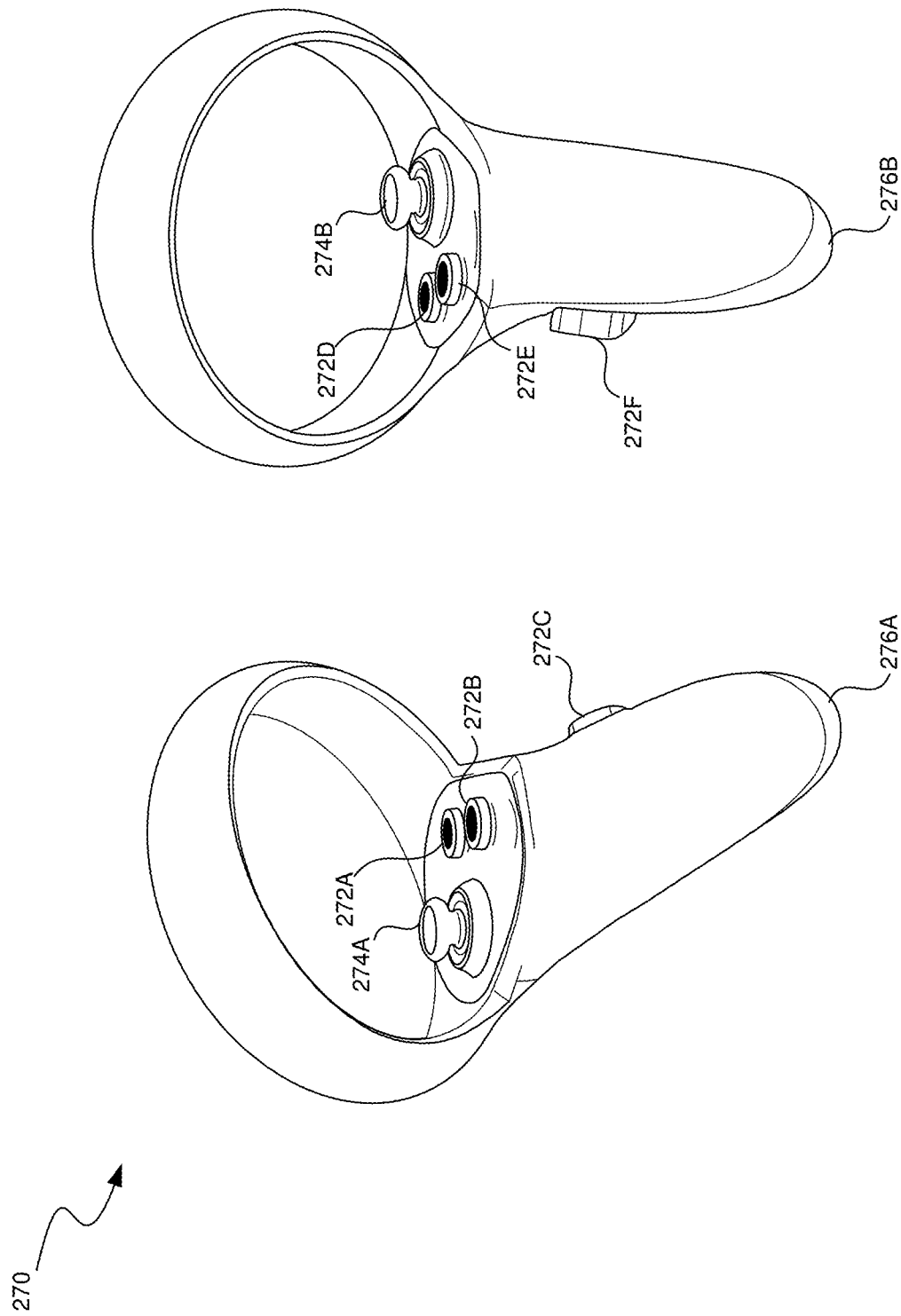
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
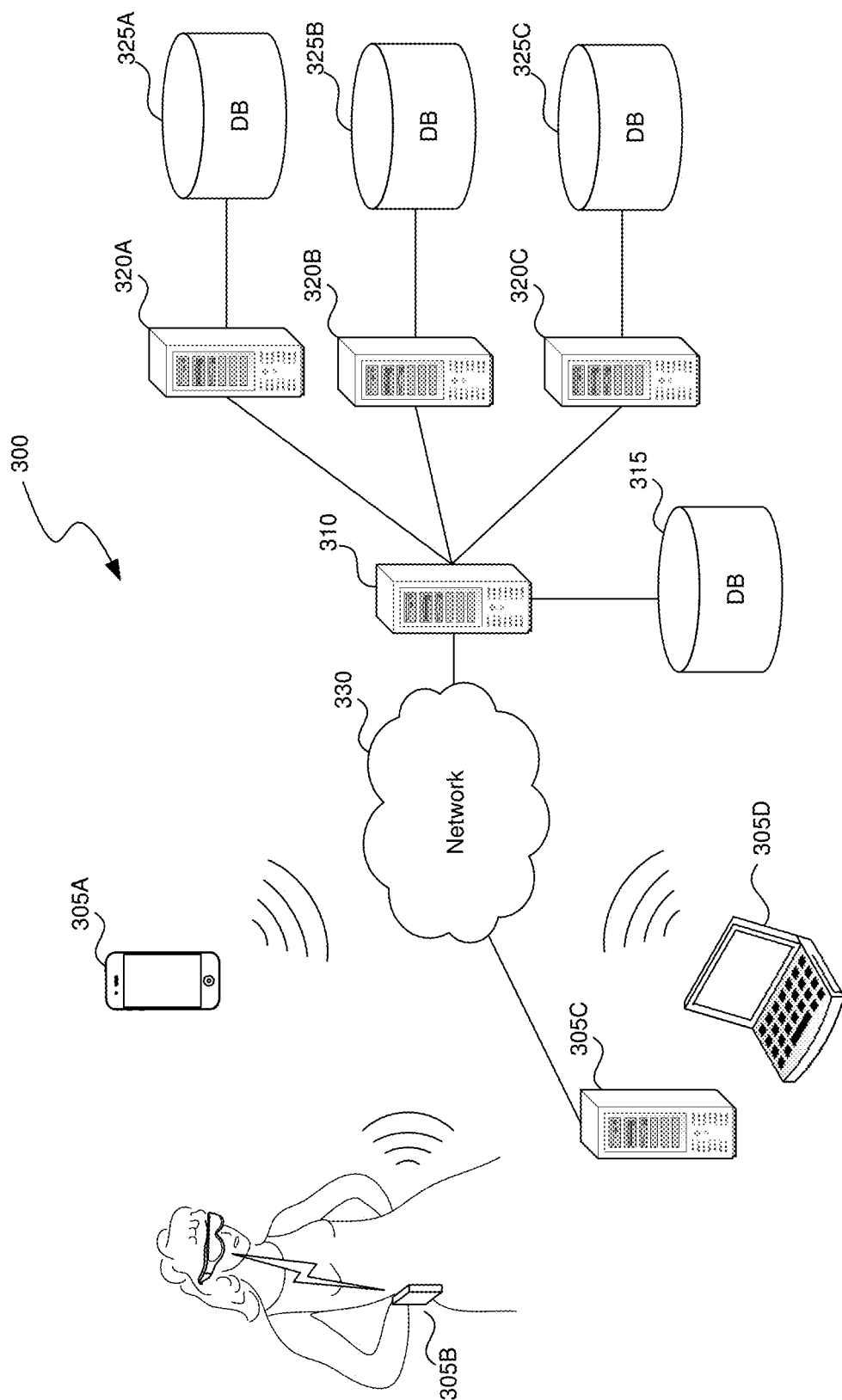
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
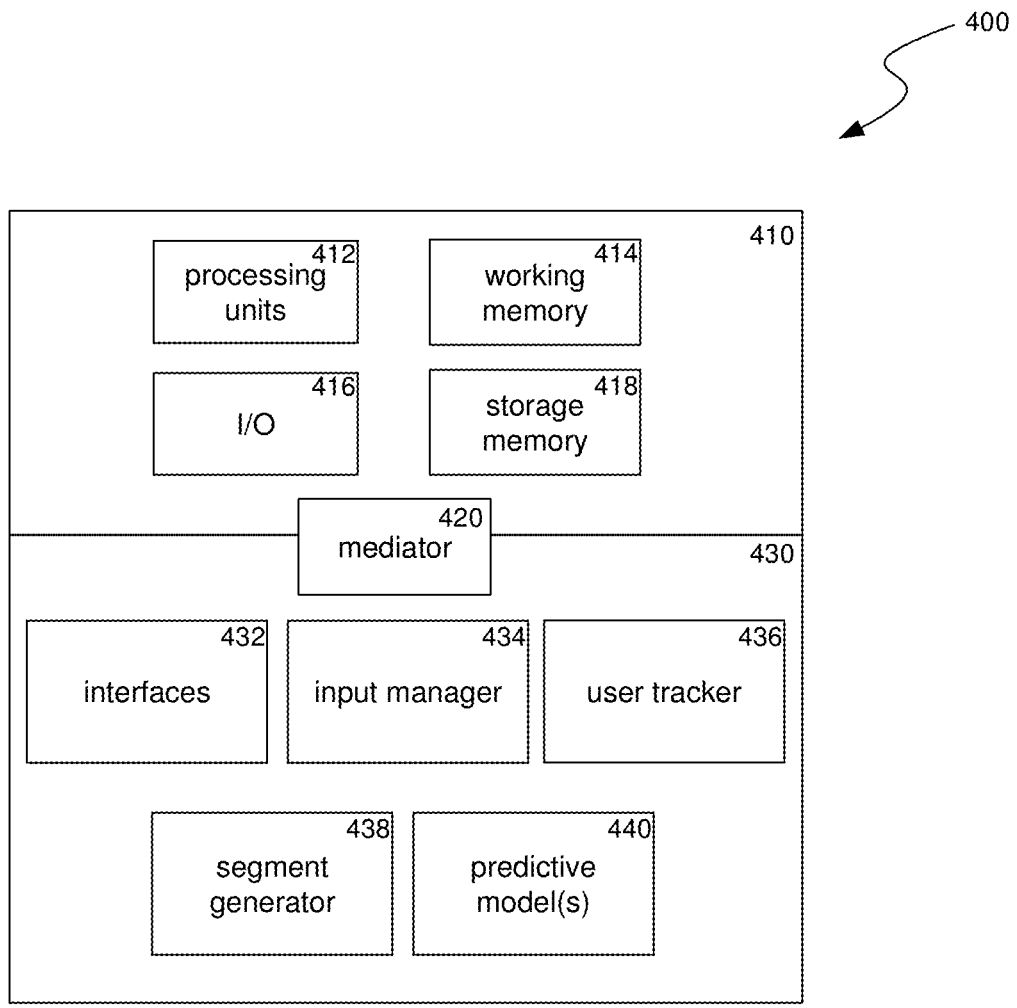
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for triggering virtual keyboard selections using multiple input modalities. Specialized components 430 can include input manager 434, user tracker 436, segment generator 438, predictive model(s) 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Input manager 434 can manage the display of a virtual interface (e.g., virtual keyboard) and various input modalities from the user to perform selections from the virtual interface (e.g., character selections). For example, input manager 434 can display a virtual keyboard within the line of sight of a user. In some implementations, the virtual keyboard can be displayed at a threshold distance (or within a distance range) from the user. For example, the virtual keyboard can be displayed at least 0.5 meters from the user, out of arm's length from the user, any combination of these, or at any other suitable distance. Implementations track a user's gaze, and input manager 434 can control the display of the virtual keyboard such that it continues to be within a line of sight for the user given user movements (e.g., head turns, body turns, etc.).

Implementations of input manager 434 can receive tracked user gaze input and tracked user hand input, and in combination these tracked inputs can be used to trigger one or more character selections from the displayed virtual keyboard. For example, input manager 434 can compare the tracked user hand input (e.g., tracked hand and/or finger motion) to a trigger criteria. When the tracked user hand input meets the trigger criteria, input manager 434 can resolve a virtual keyboard character that is selected by the tracked user gaze input at the time that the tracked user hand input meets the trigger criteria.

For example, the tracked user hand input can be hand and/or finger motion. Input manager 434 can determine a velocity for the hand/finger motion based on the tracking (e.g., by extrapolating a distance for the motion over time). When the determined velocity meets a velocity criteria, input manager 434 can trigger resolution of the selected character from the displayed virtual keyboard (e.g., according to the user gaze input). In some implementations, the tracked hand/finger motion can be a tap motion. An example user tap motion can involve one or more fingers extended from the user hand, where the user's hand/finger move forward (relative to the user's body), accelerate, stop, and move backward. Any other suitable motion can represent a user tap motion.

In some implementations, a velocity criteria includes detection that the user's hand/finger has reached a minimal velocity (e.g., approximately 0 m/s) after performing a forward motion (e.g., relative to the user). For example, when a first velocity threshold is exceeded by the user's hand/finger, it can represent the forward motion in a tap motion. When, after the forward motion, the determined velocity falls below a minimal velocity threshold (e.g., approximately 0 m/s) it can represent the part of a tap motion when a target is reached (e.g., when the hand/finger reach the target of the tap). In some implementations, the velocity criteria includes the first velocity threshold and the minimal velocity threshold. In this example, tracked hand/finger motion meets the velocity criteria when hand/finger forward velocity exceeds the first velocity threshold and, at a future point in time (e.g., 0.05 second, 0.1 second, any other fraction of a second, or any other suitable timing), the hand/finger forward velocity falls below the minimal velocity threshold. In this example, the time at which the velocity criteria is met can correspond to the time that the user's tap motion reaches its target.

In some implementation, the velocity criteria includes detection of a peak velocity, such as detection that the user's hand/finger has reached a peak velocity after performing a forward motion. For example, when a first velocity threshold is exceeded by the user's hand/finger, it can represent the forward motion in a tap motion. When, after the forward motion, the determined velocity reaches a peak velocity, it can represent the part of a tap motion when a target is reached (e.g., when the hand/finger reach the target of the tap). In some implementations, the velocity criteria includes the first velocity threshold and the detection of peak velocity. In this example, tracked hand/finger motion meets the velocity criteria when hand/finger forward velocity exceeds the first velocity threshold and, at a future point in time (e.g., 0.05 second, 0.1 second, any other fraction of a second, or any other suitable timing), a peak velocity is detected for the hand/finger forward velocity.

In some implementations, the detection of peak velocity can be based on a comparison between a current velocity and a past velocity. For example, a previous in time forward velocity determined for the user's hand/finger motion (e.g., calculated by processing past captured visual frames) can be compared to a current in time forward velocity for the user's hand/finger motion (e.g., calculated by processing a current captured visual frame and one or more past captured visual frames). When the comparison indicates a fall in velocity, it can be determined a peak velocity has been achieved. In this example, the time at which the velocity criteria is met can correspond to the time that the user's tap motion reaches its target. In some implementations, a prediction model can be configured to predict peak velocity for tracked hand/finger motion. For example, the prediction model can predict the peak velocity for hand/finger motion prior to its occurrence. The prediction of peak velocity can result in a more responsive virtual keyboard. In some implementations, the prediction model can be a machine learning model that is provided training data that includes historic hand/finger motion data and labels for peak velocity (or the peak velocity labels can be determined by the model).

Once the determined velocity meets the velocity criteria, input manager 434 can resolve a character selected by the tracked gaze input at the same point in time. For example, input manager 434 can determine that the tracked user hand input (e.g., hand/finger motion) meets the trigger criteria (e.g., velocity criteria) at a particular point in time, and the user gaze input at the particular point in time can correspond to a location on the virtual keyboard. Input manager 434 can resolve a character selection from the virtual keyboard according to the location on the virtual keyboard. For example, the location may be within the boundary of an element of the virtual keyboard that corresponds to the selected character, or input manager 434 may perform one or more adjustments or predictions (e.g., using predictive model(s) 440) to resolve selection between two, three, four, or more virtual keyboard elements/characters.

In some implementations, the velocity criteria includes detection of a change in direction for the user's hand/finger motion. In an example where forward motion (e.g., relative to the user's body, motion moving away from the user's torso in the direction of the user's gaze) is represented as a positive velocity value and backward motion (e.g., relative to the user's body, motion moving back towards the user's torso) is represented as a negative velocity value, the velocity criteria can be detection of a change in sign (e.g., positive or negative) for the determined velocity. When a change in direction of the determined velocity is detected, it can represent the portion of a tap motion directly after the user's hand/fingers reach the target of the tap (e.g., withdrawal of the hand/fingers after reaching the target of the tap). In this example, the time that the user's tap motion reaches its target can correspond to a time directly preceding detection of the determined velocity meeting the velocity criteria.

In this example, once input manager 434 detects that the determined velocity meets the velocity criteria, input manager 434 can resolve a character selected by the user's gaze input at a point in time directly preceding the time of detection. In some implementations, a compensation can be performed when resolving the character selection according to the user gaze input when the time at which the determined velocity meets the velocity criteria is directly after the time a user's hand/finger motion reaches a target. For example, when the user hand motion input is tracked using a visual sensor (e.g., camera) one or more visual frames prior to the visual frame that triggered detection of the determined velocity meeting the velocity criteria can be used to resolve the selected character. Input manager 434 can resolve the character selection according to tracked user gaze at the time of the one or more visual frames prior to the visual frame that triggered detection. In some implementations, the location of the keyboard key selected can be independent of where the user made the motion that met the velocity criteria—e.g., the character selection location can be based entirely on the eye gaze direction. Any other suitable compensation can be implemented to resolve character selection according to user gaze input preceding or after detection that the determined velocity meets the velocity criteria.

User tracker 436 can track a user's body to obtain user input in various modalities. For example, user tracker 436 can track a user eye gaze based on eye tracking, heading tracking, facial tracking and the like. One or more sensors of an XR system (e.g., cameras, wearable sensors such as accelerometer(s), etc.) can sense the user's body conditions (e.g., head movement, eye movement, etc.) and user tracker 436 can receive these sensed conditions to track user eye gaze. In another example, user tracker 436 can also track a user's hand(s) motion. One or more sensors of an XR system (e.g., cameras, wearable sensors such as accelerometer(s), hand-held controllers, etc.) can sense the user's body conditions (e.g., hand movement, wrist movement, arm movement, finger movement, and the like) and user tracker 436 can receive these sensed conditions to track user hand motion. The tracked user gaze and tracked user hand motion can be provided to input manager 434 as tracked user gaze input and tracked user hand input.

Segment generator 438 can generate a sequence of characters, such as words or sentences, that correspond to the character selections resolved by input manager 434. For example, a sequence of selected characters can be resolved by input manger 434 according to the tracked user hand input and tracked user gaze input. In some implementations, segment generator 438 can select among outputs from predictive model(s) 440. For example, based on an initial set of characters, predictive model(s) 440 may predict a word being input by the user. The prediction can include multiple predicted words with weighted probabilities for each. Segment generator 438 can select from the multiple word predictions using historic usage data for the user. In some implementations, a machine learning model can be trained using the historic usage data for the user to select among word predictions from predictive model(s) 440.

Predictive model(s) 440 can predict character selections or combinations of character selections. In some implementations, predictive model(s) 440 can include a language model that stores character sequences and/or words in association with usage probabilities. The language model can be used to configure predictive model(s) 440 and/or select among outputs generated by predictive model(s) 440. Predictive model(s) 440 can include any other suitable character prediction models known to one of ordinary skill in the art.

One or more predictive model(s) 440 can be machine learning models configured to receive tracked user gaze input and predict an element from a virtual interface (e.g., alphanumeric character from a virtual keyboard) that the user intends to select using the tracked user gaze. These model(s) can be trained with training data that includes example instances of tracked user gaze input and labels of selected alphanumeric characters.

Implementations display a virtual keyboard at a distance from a user that supports gaze-based character selection. Character input in an XR environment can be achieved through a variety of techniques, such as key selection using a collider virtual keyboard (e.g., detection that a user's tracked hand motion overlaps with a two-dimensional region or three-dimensional volume of a virtual key), gazed-based character selection, and other suitable techniques. However, the distance and placement of the displayed virtual keyboard can improve user experience.

Figure 5:
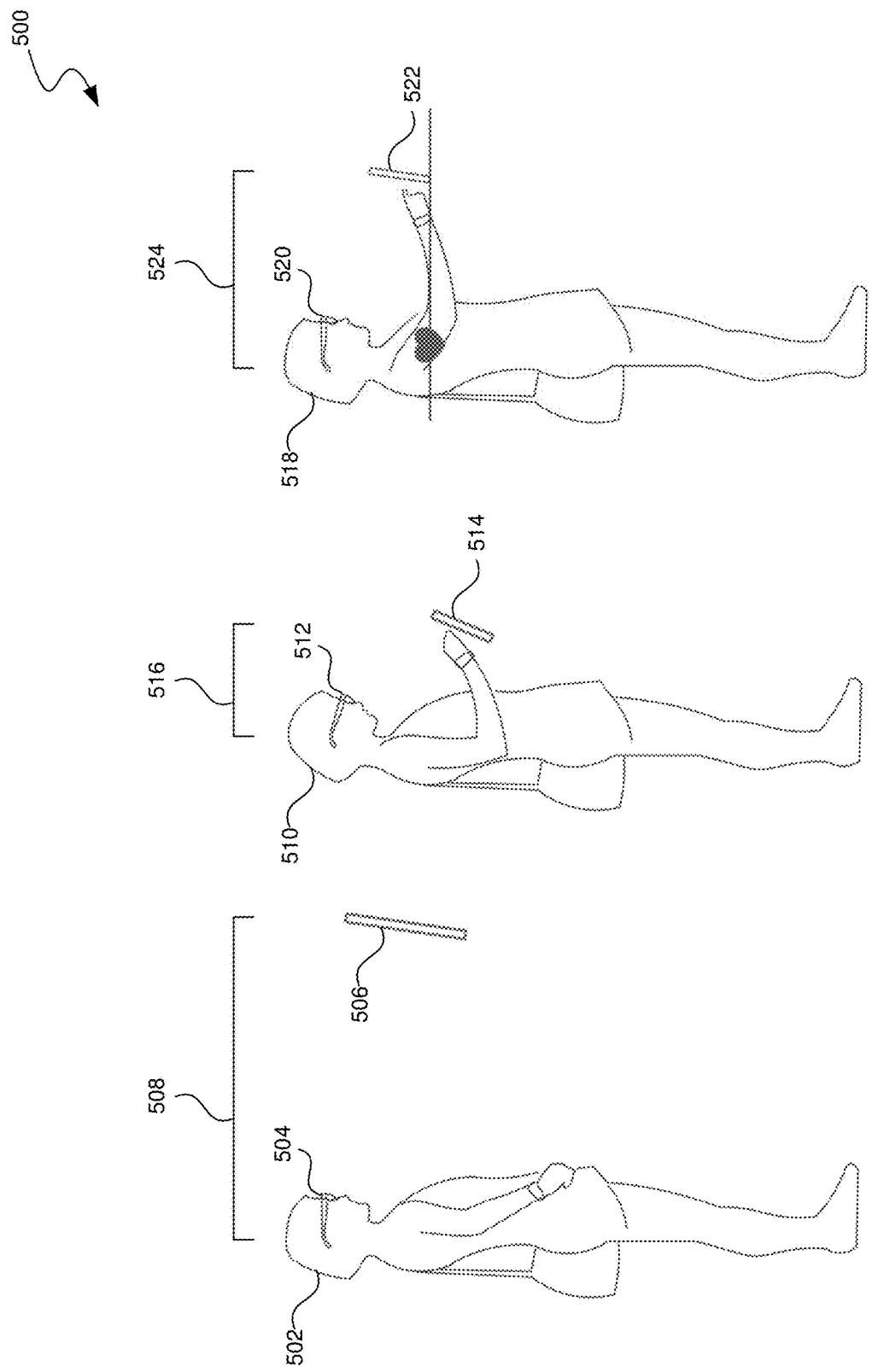
FIG. 5 is a diagram illustrating virtual keyboard placement relative to a user in an artificial reality environment.

FIG. 5 is a diagram illustrating virtual keyboard placement relative to a user in an artificial reality environment. Diagram 500 includes user 502, XR system 504, virtual keyboard 506, distance 508, user 510, XR system 512, virtual keyboard 514, distance 516, user 518, XR system 520, virtual keyboard 522, and distance 524. XR system 504 displays virtual keyboard 506 to user 502 at distance 508, XR system 512 displays virtual keyboard 514 to user 510 at distance 516, and XR system 520 displays virtual keyboard 522 to user 518 at distance 524.

The display of virtual keyboard 506 can align several favorable factors that the display of virtual keyboards 514 and 522 fail to achieve. For example, distance 508 can achieve a convergence distance from user 502 that reduces eye fatigue and enhances visual clarity. For example, distance 508 can be approximately 1 meter, or between 0.8 meters and 1.5 meters. Distances 516 and 524, which are smaller than distance 508, fail to achieve the benefits of this convergence distance.

XR systems 512 and 520 are also configured to receive input from users 510 and 518 according to hand/finger interactions between user 510 and virtual keyboard 514 and user 518 and virtual keyboard 522 (e.g., virtual keyboards 514 and 522 are collider keyboards). Because of this input style, virtual keyboards 514 and 522 are displayed within arm's reach of users 510 and 518, requiring distances 516 and 518 to be less than an optimal distance for convergence/reduced eye fatigue.

Further, virtual keyboard 514 is displayed near a vertical midpoint of user 510, thus enabling more comfortable hand/finger interactions with virtual keyboard 514. However, this requires user 510 to bend at the neck to see virtual keyboard 514, causing neck strain over time. The display location of virtual keyboard 522 mitigates the neck strain on user 518, as the virtual keyboard is displayed at shoulder height. However, hand/finger interactions with virtual keyboard 522 will cause arm fatigue over time.

Virtual keyboard 506 is displayed at a vertical location that does not require user 504 to bend her neck, thus mitigating neck strain issues. Further, virtual keyboard 506 does not require overlap between user 502's hand/finger and the virtual keys of virtual keyboard 506. Accordingly, arm fatigue is also reduced or eliminated. XR system 504 is configured to receive a combination of user gaze input relative to virtual keyboard 506 and user hand input that supports character selection from virtual keyboard 506 using techniques that improve user experience.

Figure 6:
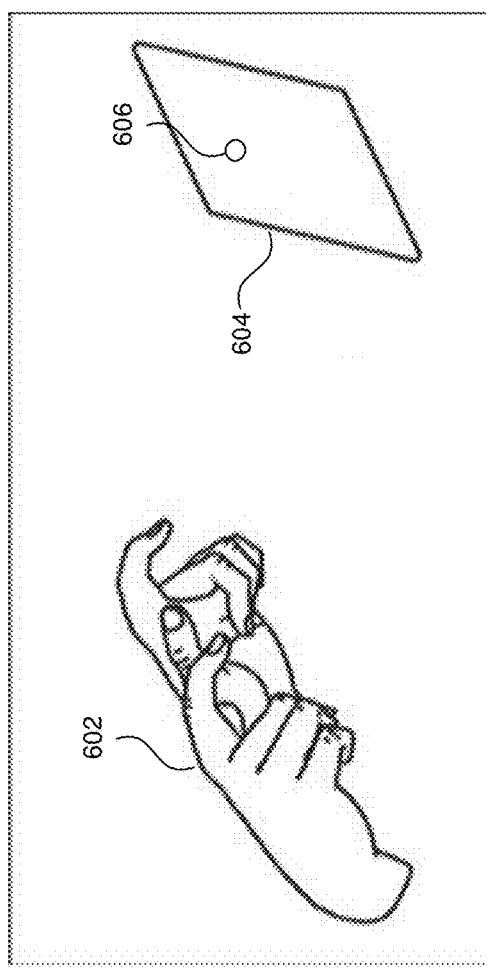
FIG. 6 is a diagram illustrating user motion relative to a virtual keyboard that triggers character selection.

FIG. 6 is a diagram illustrating user motion relative to a virtual keyboard that triggers character selection. Diagram 600 includes tracked user hands 602, virtual keyboard 604, and tracked user gaze 606. In some implementations, diagram 600 demonstrates techniques for XR system 504 that support character selection by user 502 at virtual keyboard 506.

Tracked user hands 602 can be tracked by an XR system using any suitable sensors, such as one or more cameras, wearable sensors, a hand-held controller, and any other suitable sensors. Virtual keyboard 604 can be displayed out of the reach of tracked user hands 602. Tracked user gaze 606 can be tracked relative to virtual keyboard 604 such that a location on the virtual keyboard that corresponds to the tracked user gaze can be resolved. Rather than character selection according to locations targeted by tracked user hands 602 on virtual keyboard 604, character selection can be resolved according to locations targeted by tracked user gaze 606 on virtual keyboard 604.

Tracked user hands 602 can perform a triggering action, such as a push motion, that triggers the character selection according tracked user gaze 606. For example, tracked user hands 602 depict user hands in an orientation to execute a push motion, such as a one finger extended from the user's hands with the remaining fingers curled back. Any other suitable hand/finger orientation can be implemented. The user's hands can then perform a push motion that includes a forward motion, acceleration, stop, and backward motion.

In some implementation, when the user's hand decelerates or stops it can indicate a trigger moment in time to resolve a character selection from virtual keyboard 604 according to tracked user gaze 606. The sensed motion for tracked user hands 602 can be compared to a trigger criteria, and the trigger criteria can be configured to detect the target moment that the tracked user hands 602 arrive at the target portion of the push motion. The tracked user gaze 606 relative to virtual keyboard 604 at the target moment can be used to resolve a character selection from the virtual keyboard. In some implementations, an algorithm/model can resolve the character selection according to the tracked user gaze 606 at the target moment.

In some implementations, tracked user hands 602 can alternate push motions using both hands, and each time a target moment is detected, the tracked user gaze at the target moment can be used to resolve a character selection. Accordingly, the user can input a sequence of characters using the alternating motions of tracked user hands 602 and tracked user gaze 606.

Figure 7:
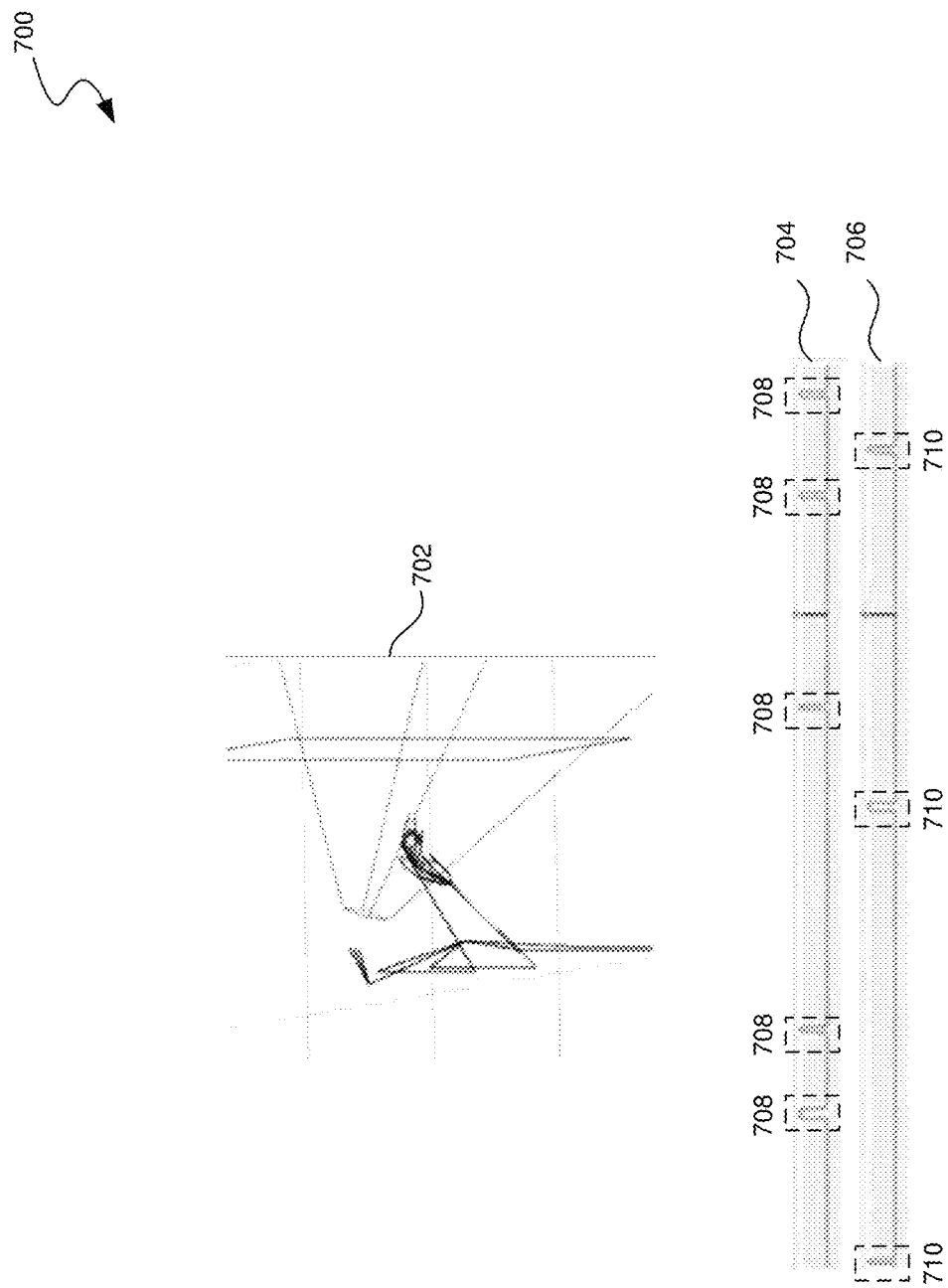
FIG. 7 is a diagram illustrating tracked user motion that triggers virtual keyboard character selection.

FIG. 7 is a diagram illustrating tracked user motion that triggers virtual keyboard character selection. Diagram 700 includes illustration 702, graph 704, graph 706, points 708, and points 710. Illustration 702 illustrates tracked user movements, including tracked motion for two user hands. Graphs 704 and 706 correspond to a trigger criteria metric/value for each tracked user hand. For example, graph 704 can correspond to tracked motion for the user's left hand, and points 708 correspond to points in time when the tracked motion for the user's left hand meets a trigger criteria (e.g., when the value of the graphed metric meets a threshold value).

Over time, the user's left hand performs several push motions, and points 708 correlate to moments in time when the user's tracked left-hand motion met the trigger criteria. At these moments in time, characters from a virtual keyboard can be resolved according to the user's tracked gaze input relative to the virtual keyboard. Similarly, graph 706 can correspond to tracked motion for the user's right hand, and points 710 correspond to points in time when the tracked motion for the user's right hand meets a trigger criteria. In some implementations, an algorithm/model can resolve the character selection according to the tracked user gaze at points 708 and/or points 710. As demonstrated by graph 704, points 708, graph 706, and points 710, the hand motions that trigger character selections according to tracked user gaze can alternate between the user's left and right hands, a single hand can perform multiple hand motions in a row, any combination of these, or any other suitable combination of hand motions can be implemented.

Those skilled in the art will appreciate that the components illustrated in FIGS. 1-7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
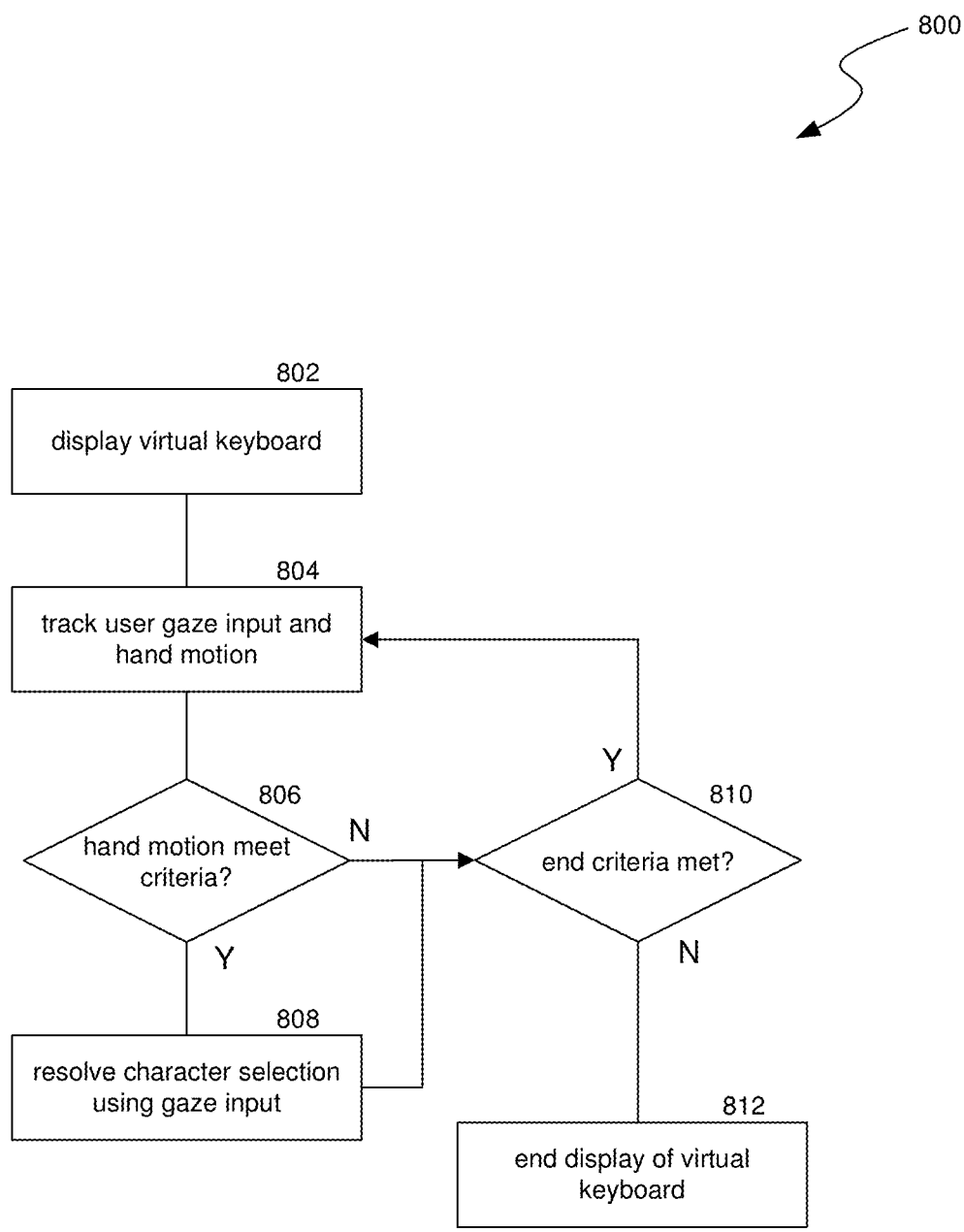
FIG. 8 is a flow diagram illustrating a process used in some implementations of the present technology for triggering virtual keyboard selections using multiple input modalities.

FIG. 8 is a flow diagram illustrating a process used in some implementations of the present technology for triggering virtual keyboard selections using multiple input modalities. In some implementations, process 800 can be performed by an application or operating system of an XR system to receive input from a user. The input received from the user can configure the application, operating system, any other element of the XR system, or be communicated to any other suitable computing device.

At block 802, process 800 can display a virtual keyboard to a user. For example, an XR system can include a display component that displays the virtual keyboard as a two-dimensional display or a three-dimensional volume. The virtual keyboard can be arranged as a pattern of virtual keys that correspond to characters. The virtual keyboard can be displayed at a distance from the user, the distance being over 0.5 m, between 0.8 m and 1.5 m, out of arm's length from the user, any combination thereof, or any other suitable distance.

At block 804, process 800 can track user gaze and the user hand motion to determine user gaze input and user hand input. For example, one or more sensors (e.g., cameras, accelerometers, wearable sensors, hand-held controllers, components of an inertial measurement unit ("IMU"), etc.) can track a user's body, including movements of a user's head, eyes, arms, hands, fingers, torso, and any other suitable movements. The sensed movements can be tracked to generate tracked user gaze input and tracked user hand/finger input (e.g., user hand motion).

At block 806, process 800 can determine whether the tracked user hand motion meets a trigger criteria. For example, the tracked user hand motion can be compared to a trigger criteria. In some implementations, the trigger criteria can be a velocity criteria. Further disclosure about the tracked user hand motion meeting the trigger criteria is described with reference to process 900 of FIG. 9. When the tracked user hand motion meets the trigger criteria, process 800 can progress to block 808. When the tracked user hand motion does not meet the trigger criteria, process 800 can progress to block 810.

At block 808, process 800 can resolve a character selection from the displayed virtual keyboard according to the user gaze input. For example, a location of the tracked user gaze input relative to the displayed virtual keyboard can be determined. The determined location may be within the boundary of an element of the virtual keyboard that corresponds to the selected character, or one or more adjustments or predictions (e.g., using predictive model(s)) can be performed to resolve selection between two, three, four, or more characters. In some implementations, the location can be based only on the gaze direction at the time of the tap gesture (i.e., is not based on where the user make the tap gesture).

In some implementations, when the tracked user hand input meets the trigger criteria, a selected character can be resolved according to tracked user gaze input at the time of detection that the tracked user hand input meets the trigger criteria (or within a threshold time from the time of detection). For example, the trigger criteria can be a velocity criteria, and when it is detected that tracked hand or finger motion meets the velocity criteria, the character resolution according to the tracked gaze input can be triggered. The character selection can be resolved according to only the tracked gaze input at the time it is detected that the hand or finger motion meets the velocity criteria or according to tracked gaze input at an adjusted time from the time of detection (e.g., predetermined adjustment of time in the past or in the future). For example, a user may look at a key and start to make a tapping gesture and look to her next intended key before the tap gesture is complete. The predetermined adjustment time can be an amount determined for users generally for how long before a trigger criteria the user was looking at an intended key or can be specific to the current user, determined through an onboarding process where a user is entering known phrases or based on the user's use of the system over time and correlating input corrections made by the user to timing values. In some implementations, the adjustment of time can be determined by a trained machine learning model. For example, the machine learning model can receive training data that includes historic hand/finger motion data over time and labels for the target key and/or the intended detection time. The machine learning model can learn trends using the hand/finger motion and the intentions of multiple users to determine an effective adjustment of time.

At block 810, process 800 can determine whether an end criteria has been met. For example, the user can signal the end of an input session using the virtual keyboard (e.g., by selecting a close element, performing a predetermined gesture, or by any other suitable means) or an idle timer can expire without receiving user input (e.g., tracked user hand motion that meets the trigger criteria). When the end criteria is met, process 800 can progress to block 812. When the end criteria is not met, process 800 can loop back to block 804, where process 800 tracks user gaze input and user hand motion to resolve additional character selections.

At block 812, process 800 can end the display of the virtual keyboard. For example, the virtual keyboard displayed can be discontinued and the XR system can transition to another interface, display mode, or operation mode. Implementations of process 800 can be performed to generate sequences of characters corresponding to user input.

Figure 9:
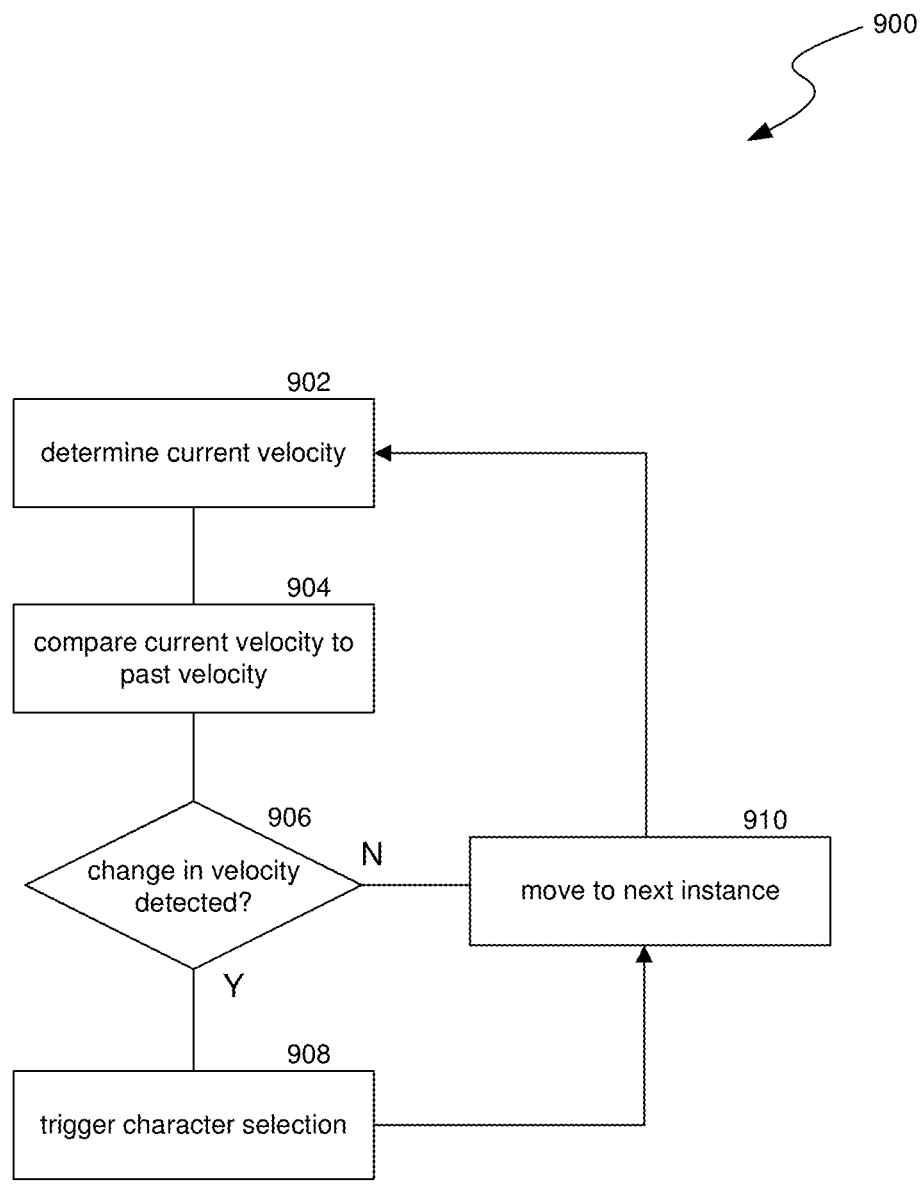
FIG. 9 is a flow diagram illustrating a process used in some implementations of the present technology for detecting user motion that triggers virtual keyboard selections.

FIG. 9 is a flow diagram illustrating a process used in some implementations of the present technology for detecting user motion that triggers virtual keyboard selections. In some implementations, process 900 can be performed by an application or operating system of an XR system to receive input from a user. The input received from the user can configure the application, operating system, any other element of the XR system, or be communicated to any other suitable computing device. Process 900 can be combined with process 800 of FIG. 8 to trigger character selections from the virtual keyboard.

At block 902, process 900 can determine a current velocity for the user hand motion. For example, tracked user hand input can correspond to hand and/or finger motion, and a velocity for the hand/finger motion can be determined by extrapolating a distance for the motion over time. In some implementations, the user hand motion is tracked using one or more cameras, and the captured visual frames can be processed to locate the user's hand/finger in the frames. By processing successive visual frames, the distance the user's hand/finger travels over the time span for the frames can be extrapolated to determine a velocity for the user hand motion.

In some implementations, the tracked user hand motion is transformed relative to a user position (e.g., tracked user body position/gaze) such that the determined velocity comprises a velocity relative to the user. The determined velocity for the user hand motion can also be filtered and/or adjusted. For example, a first axis component (e.g., x-axis component) of the tracked user hand motion can be filtered. In another example, a second axis component of the tracked user hand motion (e.g., y-axis component) can be inverted.

At block 904, process 900 can compare the current velocity to a past velocity for the user hand motion. For example, a previous velocity for the user hand motion (e.g., calculated using past visual frames) can be compared to the current velocity for the user hand motion, and the comparison can be stored. At block 906, process 900 can determine whether a change in velocity that meets a trigger criteria is detected. For example, the trigger criteria can include a change in velocity criteria.

In some implementations, the change in velocity criteria can be detection of a decrease in velocity that indicates a peak velocity has been reached. For example, when the comparison between a current forward velocity and a past forward velocity demonstrates a decrease in velocity, the comparison indicates a peak velocity has been reached. In some implementations, when the stored comparison indicates a decrease in the determined velocity, the velocity criteria is met.

In some implementations, the change in velocity criteria can be detection of a change in sign (e.g., direction of motion) that indicates a change in velocity direction has been detected. In an example where forward motion (e.g., relative to the user's body, motion moving away from the user's torso in the direction of the user's gaze) is represented as a positive velocity value and backward motion (e.g., relative to the user's body, motion moving back towards the user's torso) is represented as a negative velocity value, the velocity criteria can be detection of a change in sign (e.g., positive or negative). In some implementations, when the stored comparison indicates a change in sign for the determined velocity, the velocity criteria is met.

When the change in velocity meets the trigger criteria, process 900 can progress to block 908. When the change in velocity does not meet the trigger criteria, process 900 can progress to block 910. At block 908, process 900 can trigger character selection using a displayed virtual keyboard according to user gaze input. For example, block 808 of FIG. 8 can be triggered when the trigger criteria is met.

At block 910, process 900 can move to a next instance of user hand motion tracking. In some implementations, user hand motion can be tracked using captured visual frames. A next instance of user hand motion tracking can be a next visual frame (or a next batch of visual frames) that can be used to determine an updated current velocity for the user hand motion. Any other suitable tracking and next instance of tracking can be implemented.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for triggering virtual keyboard selections using multiple input modalities, the method comprising:
    displaying, to a user, a virtual keyboard in an augmented reality environment;
    tracking a) user gaze input in relation to the virtual keyboard and b) user hand motion, wherein the virtual keyboard is displayed to appear at a distance greater than 0.5 meters from the user within the augmented reality environment;
    detecting a first instance when the tracked user hand motion meets a velocity criteria;
    in response to the detecting the first instance when the tracked user hand motion meets the velocity criteria, resolving a first character selection according to the user gaze input, in relation to the virtual keyboard, at a time that corresponds to the detected first instance when the user hand motion meets the velocity criteria, wherein the resolving the first character selection is not based on a position of the user's hand in relation to the virtual keyboard;
    detecting a second instance when the tracked user hand motion meets the velocity criteria;
    in response to the detecting the second instance when the tracked user hand motion meets the velocity criteria, resolving a second character selection according to the user gaze input, in relation to the virtual keyboard, at a time that corresponds to the detected second instance when the user hand motion meets the velocity criteria; and
    generating a character sequence comprising the resolved first and second character selections.

2. The method of claim 1, wherein the velocity criteria is met when a peak velocity is detected for a user's hand motion or finger motion.

3. The method of claim 2, further comprising:
    analyzing the tracked user hand motion to determine a velocity for a user's hand motion or finger motion, wherein the tracked user hand motion is transformed relative to a user position such that the determined velocity comprises a velocity relative to the user, and the first instance when the tracked user hand motion meets the velocity criteria is detected when the determined velocity is a peak velocity for the tracked user hand motion.

4. The method of claim 3, wherein analyzing the tracked user hand motion to determine the velocity for the user's hand motion or finger motion comprises filtering out a first axis component of the tracked user hand motion and inverting a second axis component of the tracked user hand motion.

5. The method of claim 3, wherein the peak velocity is detected for a user's hand motion or finger motion by comparing a previous determined velocity to a current determined velocity and detecting a negative change in velocity based on the comparison.

6. The method of claim 1, wherein the character sequence is generated by:
    iteratively detecting, based on the tracking, that the user hand motion meets the velocity criteria; and iteratively resolving a character selection according to the user gaze input at a time that corresponds to each instance of the detected user hand motion meeting the velocity criteria.

7. The method of claim 6, wherein the tracked user hand motion comprises alternating motion between two user hands, and the iterative detection that the user hand motion meets the velocity criteria and the iterative resolving of the character selection corresponds to the alternating motion between the two user hands.

8. The method of claim 1, wherein the velocity criteria is met when a minimal velocity is detected for a user's hand motion or finger motion.

9. The method of claim 1, wherein the user hand motion is motion of a user's hand in a real-world environment that is tracked via one or more cameras and/or one or more motion sensors.

10. The method of claim 9, wherein the user hand motion is tracked via the one or more motion sensors, and the one or more motion sensors comprise wearable motion sensors or an inertial measurement unit.

11. A non-transitory computer-readable storage medium storing instructions that, when executed by a computing system, cause the computing system to perform a process for triggering virtual keyboard selections using multiple input modalities, the process comprising:
displaying, to a user, a virtual keyboard in an augmented reality environment, wherein the virtual keyboard is displayed to appear at a distance greater than 0.5 meters from the user within the augmented reality environment;
tracking a) user gaze input in relation to the virtual keyboard and b) user hand motion;
detecting a first instance when the tracked user hand motion meets a velocity criteria;
in response to the detecting the first instance when the tracked user hand motion meets the velocity criteria, resolving a first character selection according to the user gaze input, in relation to the virtual keyboard, at a time that corresponds to the detected first instance when the user hand motion meets the velocity criteria, wherein the resolving the first character selection is not based on a position of the user's hand in relation to the virtual keyboard;
detecting a second instance when the tracked user hand motion meets the velocity criteria;
in response to the detecting the second instance when the tracked user hand motion meets the velocity criteria, resolving a second character selection according to the user gaze input, in relation to the virtual keyboard, at a time that corresponds to the detected second instance when the user hand motion meets the velocity criteria; and
generating a character sequence comprising the resolved first and second character selections.

12. The non-transitory computer-readable storage medium of claim 11, wherein the velocity criteria is met when a peak velocity is detected for a user's hand motion or finger motion.

13. The non-transitory computer-readable storage medium of claim 12, wherein the process further comprises:
analyzing the tracked user hand motion to determine a velocity for a user's hand motion or finger motion, wherein the tracked user hand motion is transformed relative to a user position such that the determined velocity comprises a velocity relative to the user, and the first instance when the tracked user hand motion meets the velocity criteria is detected when the determined velocity is a peak velocity for the tracked user hand motion.

14. The non-transitory computer-readable storage medium of claim 13, wherein analyzing the tracked user hand motion to determine the velocity for the user's hand motion or finger motion comprises filtering out a first axis component of the tracked user hand motion and inverting a second axis component of the tracked user hand motion.

15. The non-transitory computer-readable storage medium of claim 13, wherein the peak velocity is detected for a user's hand motion or finger motion by comparing a previous determined velocity to a current determined velocity and detecting a negative change in velocity based on the comparison.

16. The non-transitory computer-readable storage medium of claim 11, wherein the character sequence is generated by:
iteratively detecting, based on the tracking, that the user hand motion meets the velocity criteria; and
iteratively resolving a character selection according to the user gaze input at a time that corresponds to each instance of the detected user hand motion meeting the velocity criteria.

17. The non-transitory computer-readable storage medium of claim 16, wherein the tracked user hand motion comprises alternating motion between two user hands, and the iterative detection that the user hand motion meets the velocity criteria and the iterative resolving of the character selection corresponds to the alternating motion between the two user hands.

18. A computing system for triggering virtual keyboard selections using multiple input modalities, the computing system comprising:
one or more processors; and
one or more memories storing instructions that, when executed by the one or more processors, cause the computing system to perform a process comprising:
displaying, to a user, a virtual keyboard in an augmented reality environment;
tracking a) user gaze input in relation to the virtual keyboard and b) user hand motion, wherein the virtual keyboard is displayed to appear at a distance greater than 0.5 meters from the user within the augmented reality environment;
detecting a first instance when the tracked user hand motion meets a velocity criteria;
in response to the detecting the first instance when the tracked user hand motion meets the velocity criteria, resolving a first character selection according to the user gaze input, in relation to the virtual keyboard, at a time that corresponds to the detected first instance when the user hand motion meets the velocity criteria,
wherein the resolving the first character selection is not based on a position of the user's hand in relation to the virtual keyboard;
detecting a second instance when the tracked user hand motion meets the velocity criteria;
in response to the detecting the second instance when the tracked user hand motion meets the velocity criteria, resolving a second character selection according to the user gaze input, in relation to the virtual keyboard, at a time that corresponds to the detected second instance when the user hand motion meets the velocity criteria; and generating a character sequence comprising the resolved first and second character selections.

19. The system of claim 18, wherein the velocity criteria is met when a peak velocity is detected for a user's hand motion or finger motion.

20. The system of claim 19, wherein the process further comprises:
- analyzing the tracked user hand motion to determine a velocity for a user's hand motion or finger motion, wherein the tracked user hand motion is transformed relative to a user position such that the determined velocity comprises a velocity relative to the user, and the first instance when the tracked user hand motion meets the velocity criteria is detected when the determined velocity is a peak velocity for the tracked user hand motion.

* * * * *